United States Patent [19]
Ocken et al.

[11] Patent Number: 5,702,668
[45] Date of Patent: Dec. 30, 1997

US005702668A

[54] COBALT-FREE HARDFACING ALLOYS WITH IMPROVED WELDING CHARACTERISTICS

[75] Inventors: Howard Ocken, Palo Alto, Calif.; Shane J. Findlan, Harrisburg; Michael K. Phillips, Matthews, both of N.C.

[73] Assignee: Electric Power Research Insitute, Inc., Palo Alto, Calif.

[21] Appl. No.: 708,177

[22] Filed: Sep. 6, 1996

Related U.S. Application Data

[63] Continuation-in-part of Ser. No. 333,959, Nov. 3, 1994, abandoned.

[51] Int. Cl.$^6$ .................................................. C22C 38/44
[52] U.S. Cl. ........................... 420/57; 420/67; 148/327
[58] Field of Search ..................... 420/57, 67; 148/327

[56] References Cited

U.S. PATENT DOCUMENTS 4,803,045  2/1989  Ohriner et al. .
4,888,153  12/1989  Yabuki et al. .

FOREIGN PATENT DOCUMENTS 52-32814  12/1977  Japan .

*Primary Examiner*—Deborah Yee
*Attorney, Agent, or Firm*—Fish & Richardson P.C.

[57] ABSTRACT

Novel cobalt-free iron-base, wear-resistant and anti-galling, hardfacing alloys are provided. These alloys are capable of being deposited on substrates by welding without preheating the substrate, thus facilitating field applications of cobalt-free alloys.

15 Claims, No Drawings

5,702,668

COBALT-FREE HARDFACING ALLOYS WITH IMPROVED WELDING CHARACTERISTICS

CROSS REFERENCE TO RELATED APPLICATIONS

This is a continuation-in-part of Ser. No. 08/333,959, filed Nov. 3, 1994, now abandoned.

The present invention relates to cobalt-free hardfacing alloys with improved welding characteristics, and in particular to cobalt-free iron-base wear-resistant and anti galling, hardfacing alloys capable of being deposited on a substrate by welding, without preheating the substrate.

BACKGROUND OF THE INVENTION

Hardfacing alloys are used to impart wear resistance to less expensive alloys in a variety of industries and applications. Cobalt is a key constituent of many of the best performing of the hardfacing alloys that are most extensively used. Because of the high cost of cobalt and because its market price fluctuates significantly, it has been desirable to develop hardfacing alloys with reduced levels of cobalt.

A special need exists to reduce the cobalt content of the hardfacing alloys used in the primary system of nuclear power plants. The small amount of wear and corrosion the cobalt-base alloys experience ultimately results in the formation of the gamma-emitting isotope $^{60}Co$. This isotope is incorporated into the oxides that form on out-of-core component that must be inspected, repaired or replaced by maintenance personnel. The activated $^{60}Co$ is responsible for most of the radiation exposure these workers receive.

However, a cobalt-free hardfacing alloy, that is one containing no more than trace amounts of cobalt, in addition to being wear-resistant, must also show adequate levels of hardness, weldability and corrosion resistance. U.S. Pat. No. 4,803,045, the disclosure of which is incorporated by reference herein in its entirety, describes iron-base alloys with resistance to adhesive (galling) wear matching that of the standard cobalt-base alloys. Outstanding wear resistance in alloys prepared as castings and by gas tungsten arc welding (GTAW) and plasma tungsten arc welding (PTAW) is disclosed. However, while some success has been achieved with depositing these alloys by GTAW on stainless steel without preheating, significant preheating was required to obtain sound, defect-free welds when depositing these alloys on carbon steel substrates. Typically preheating to about 200° C. for compositions with low carbon contents and to about 425° C. with compositions containing high carbon contents is required.

Cobalt-free hardfacing alloys that could be deposited on a variety of substrates, including stainless steel and carbon steel, without preheating, would mark a significant advance, making the weldability of such alloys equivalent to the cobalt base alloys which can be welded without preheating. The ability to weld without preheating would also facilitate field applications of wear-resistant cobalt-free alloys.

It is thus an object of the present invention to provide cobalt-free iron-base, wear-resistant and anti-galling, hardfacing alloys capable of being deposited on a substrate by welding, without preheating the substrate.

It is another object of the present invention to provide methods for constructing components exposed to wear and corrosive (aggressive) environments, whereby the components are hardfaced with wear-resistant, anti-galling, cobalt-free alloys by welding, without preheating the substrate.

These and other objects of the invention will be made apparent from the following detailed description of the invention and appended claims.

SUMMARY OF THE INVENTION

The present invention provides cobalt-free iron-base wear-resistant and anti galling, hardfacing alloys consisting essentially by weight of about 1.10–1.35% carbon; at least 4.0%, but less than 5.0% manganese; 3.0–3.5% silicon; 22.5–26.0% chromium; 3.7–4.2% nickel; 1.8–2.2% molybdenum; 0.02–0.18% nitrogen; less than 0.018% phosphorus; less than 0.010% sulphur; less than 0.002% boron; and the balance iron. These alloys have a microstructure consisting essentially of austenitic matrix and eutectic alloy carbides, and are capable of being deposited on substrates by welding without preheating the substrate.

DETAILED DESCRIPTION OF THE INVENTION

The present invention provides cobalt-free iron-base, wear-resistant and anti-galling hardfacing alloys that can be deposited by welding on substrates, including stainless steel and carbon steel, without the need for preheating the substrate. The alloys of the present invention have excellent wear resistance and particularly good anti-galling properties. Galling wear is the phenomenon which occurs when two metallic surfaces slide upon each other under a load, whereby partial adhesion takes place on the contacting surfaces, roughens them, and results in a transfer of material. The transfer of material constitutes galling wear, usually measured in terms of a change in depth of the surface roughness. The extent of galling wear is a function of not only the characteristics of the surfaces in contact with each other, but also of the characteristics of the respective sub-surfaces since the surfaces are under a load.

The present invention provides the hardfacing, wear-resistant and galling-resistant surfaces of a cobalt-based hardfacing alloy, without the use of cobalt, due to the disadvantages of cobalt in certain applications described above. Moreover, the present invention provides cobalt-free alloys having a microstructure consisting of an austenitic (iron-based) matrix and eutectic alloy carbides which provide the wear and galling resistance required for hardfacing alloys, and which do not require preheating of the substrate for welding.

The cobalt-free alloys according to the present invention have the following composition: About 1.10–1.35% carbon; at least 4.0%, but less than 5.0% manganese; 3.0–3.5% silicon; 22.5–26.0% chromium; 3.7–4.2% nickel; 1.8–2.2% molybdenum; 0.02–0.18% nitrogen; less than 0.018% phosphorus; less than 0.010% sulphur; less than 0.002% boron; less than 0.050% cobalt; less than 200 parts-per-million oxygen; and the balance iron.

Iron dissolves more carbon and nitrogen than nickel in austenitic structures. Therefore, the alloys of the present invention are iron-based. However, since pure iron is ferritic in structure at room temperature, austenite formers such as nickel and manganese are added to stabilize the austenitic structure. U.S. Pat. No. 4,803,045, incorporated by reference herein, teaches that since the presence of manganese also increases carbon solubility, it is desired to be the major austenitic stabilizer. A useful range of 5–13% by weight of for manganese and 4–12% by weight of nickel was disclosed, with the preferred alloy composition containing about 8% s manganese and about 5% nickel.

Subsequent research has resulted in determination of refined ranges for alloy compositions having improved welding characteristics, in particular, eliminating the need for preheating. The role of some minor impurity elements on ease of welding has also been identified.

It has now been discovered that a hardfacing iron-based, cobalt-free alloy with an austenitic stabilizer comprising less than 5% manganese by weight can be made having the same wear-resistant and anti-galling properties as the previously known cobalt-free hardfacing alloys, but is weldable without preheating of the substrate. Cobalt-free alloys with an austenitic stabilizer comprising greater than 4%, but less than 5% manganese by weight of the alloy formed, and preferably about 4.5% by weight, and nickel in an amount of 3.7–4.2% by weight, and preferably 4.0% by weight have been found to be weldable without preheating of the substrate.

The amounts of other elements used in the previously known compositions of cobalt-free hardfacing alloys continue to be used in amounts previously disclosed, although some further refinement has also been achieved within the disclosed ranges. Silicon, which is used to increase the solid solution strengthening of the iron matrix and to also increase the fluidity of the molten alloy during processing, is used in an amount of 3.0–3.5% by weight, and preferably 3.1–3.5%, for the appropriate combination of hardness and toughness. A proportional amount of about 3.3% is preferred.

Molybdenum also provides solid solution strengthening and, in particular, provides interaction solid-solution strengthening with carbon. Therefore, some molybdenum content may stabilize undesired alloy carbides such as $M_6C$, and tend to reduce the carbon content of the solid solution. The refined range for molybdenum is 1.8–2.2% by weight, and preferably about 2.0% by weight.

Nitrogen increases the solid solution strengthening, and particularly increases strain hardening. However, too high a nitrogen content may cause problems in welding, therefore it is preferred that nitrogen be utilized in the range of 0.02–0.18% by weight, and preferably about 0.14–0.18% by weight. A proportional amount of about 0.16% is preferred.

Chromium is utilized to provide primarily corrosion resistance and is utilized in a range of about 22.5–26%, and preferably 24–26% by weight. A proportional amount of about 25% is preferred.

To provide the desired matrix and carbides, carbon is utilized in the amounts of 1.10–1.35% by weight, and preferably about 1.25% by weight.

As noted above, the alloys of the present invention have lower Mn contents and typically have lower nickel (Ni) contents than the compositions disclosed in U.S. Pat. No. 4,803,045. It is believed that adjustment of the amounts of these elements, in particular the amount of manganese below 5%, is largely responsible for the unexpected improvement in welding characteristics.

Further, a number of impurity elements play critical roles in rendering cobalt-free alloys more difficult to weld. Tramp elements, particularly phosphorus (P), boron (B) and sulphur (S) have been found to have adverse effects on achieving sound welds. The alloys of the present invention contain less than 0.018% P, less than 0.01% S, and less than 0.002% B.

These above-noted adjustments provide a class of alloys that may be deposited by welding on both stainless steel and carbon steel, without the need for preheating of the substrate. It is expected that the improved alloys may be similarly advantageous when applied to nickel-based or other substrates. Alloys according to the present invention are weldable, and can also be produced as other product forms, such as castings and strip, and still provide the desired wear resistance. When used as a weld-consumable, they may be applied by a variety welding techniques, including conventional gas tungsten arc welding (GTAW), plasma tungsten arc welding (PTAW), gas metal arc welding (GMAW) and shielded metal arc welding (SMAW).

Examples of Compositions According to the Invention are Shown in Table I.

TABLE I

| Alloy Content | | | | | | | PREFERRED WELDING |
|---|---|---|---|---|---|---|---|
| C | Mn | Si | Cr | Ni | Mo | N | TECHNIQUE |
| 1.27 | 4.47 | 3.6 | 24.21 | 4.06 | 2.08 | 0.05 | GTAW |
| 1.17 | 4.47 | 3.4 | 24.40 | 4.16 | 2.14 | 0.06 | GTAW |
| 1.08 | 3.94 | 3.3 | 22.70 | 4.12 | 1.99 | 0.03 | SMAW |
| 1.11 | 4.60 | 3.3 | 23.70 | 3.75 | 1.92 | 0.03 | GMAW |
| 1.35 | 4.38 | 3.0 | 25.20 | 3.87 | 1.96 | 0.06 | SAW |

The cobalt-free hardfacing alloys according to the present invention have excellent wear-resistance, and particularly good galling-wear-resistance. The galling test used consists of loading the flat surface of a 9.5 mm (0.375 in) diameter pin specimen against a flat specimen using a modified Brinell hardness tester. Both pin and block are made from the same alloy. Loads are applied at 9,800, 19,600 and 29,400N (2,200, 4,400 or 6,600 lb), which corresponds to a normal applied stress of 140, 275 or 415 MPa (20, 40 or 60 ksi). The pin specimen is then rotated manually ten times in alternate directions. The wear test specimen surfaces are prepared with a surface ground finish of 0.2 to 0.4 microns (18 to 16 micro-inches) arithmetic average as measured normal to the grinding direction. A degree of damage associate with each galling test was determined by surface profilometry. The surface profile was obtained for each wear scar on the galling test block in directions both parallel and perpendicular to the original grinding marks. The surface profiles were generated using a skid-referenced Bendix Microcorder with a radius stylus. The differences between the height of the highest peak and the lowest valley on each of four radial traces were calculated and averaged. The difference in heights for traverses of equivalent length, in directions parallel and perpendicular to the grinding direction on an untested surface of the same block were similarly calculated and averaged. The degree of damage for each galling test was then obtained by subtracting the average difference of the pre-test ground surface from that of galling wear test surface.

Results of galling wear tests performed on a specimen of an alloy according to the present invention and other alloys are shown in Table 2, below:

TABLE 2

| Galling Wear of GTAW Overlays | | | | | | |
|---|---|---|---|---|---|---|
| | Surface Damage (mm) at Indicated Stress (ksi) | | | | | |
| | Tests in Air | | | Tests in Water | | |
| Alloy | 20 | 40 | 60 | 20 | 40 | 60 |
| Deloro ® 40/ nickel-base | 37.1 | 41.3 | 50.0 | 17.3 | 34.7 | 40.0 |
| Deloro ® 50/ nickel-base | 38.6 | NT | 76.0 | 14.7 | 26.4 | 34.7 |
| Stellite ® 21/ | 0.9 | 1.7 | 2.2 | 0.4 | 0.9 | 1.8 |

TABLE 2-continued

Galling Wear of GTAW Overlays

| Alloy | Surface Damage (mm) at Indicated Stress (ksi) | | | | | |
|---|---|---|---|---|---|---|
| | Tests in Air | | | Tests in Water | | |
| | 20 | 40 | 60 | 20 | 40 | 60 |
| cobalt-base Stellite ® 6/ cobalt-base | 0.6 | 1.2 | 1.8 | 0.4 | 0.6 | 1.2 |
| Present Invention/ iron-base | 0.5 | 1.4 | 2.0 | 0.3 | 1.0 | 1.3 |

1. Stellite ® 6 and 21 entries are average values from two tests.
2. Present Invention entries are average values from five tests.

The alloys according to the present invention performed as well as those described in U.S. Pat. No. 4,803,045. The soundness of the welds was determined by dye penetrant tests and optical microscopy performed in accordance with established ASME Section IX weld qualification procedures. In summary, the improved cobalt-free, hardfacing alloys of the present invention have been achieved by adjusting the amounts of the various elemental components of known cobalt-free, hardfacing alloys, and by the elimination of certain tramp elements, in particular, phosphorus, sulphur and boron. The unexpected result of these refinements is a range of compositions for cobalt-free, hardfacing alloys which do not require preheating of either a stainless steel or a carbon steel substrate prior to welding. These attributes should facilitate field applications of cobalt-free alloys in many industries.

What is claimed is:

1. A cobalt-free iron-base wear-resistant and anti-galling hardfacing alloy consisting essentially by weight of about 1.10–1.35% carbon; at least 4.0%, but less than 5.0% manganese; 3.0–3.5% silicon; 22.5–26.0% chromium; 3.7–4.2% nickel; 1.8 2.2% molybdenum; 0.02–0.18% nitrogen; less than 0.018% phosphorus; less than 0.010% sulphur; less than 0.002% boron; and the balance iron; said alloy having a microstructure consisting essentially of austenitic matrix and eutectic alloy carbides.

2. An alloy according to claim 1 wherein said silicon is present in about 3.1–3.5%; chromium is present in about 24.0–26.0% and nitrogen is present in about 0.14–0.18%.

3. A alloy according to claim 1, wherein said alloy is capable of being deposited on a substrate by welding, wherein preheating of the substrate is unnecessary.

4. An alloy according to claim 1, consisting essentially by weight of 1.25% carbon; 4.5% manganese; 3.3% silicon; 25.0% chromium; 4.0% nickel; 2.0% molybdenum; 0.16% nitrogen; less than 0.018% phosphorus; less than 0.010% sulphur; less than 0.002% boron; and the balance iron; said alloy having a microstructure consisting essentially of austenitic matrix and eutectic alloy carbides.

5. In a method for constructing a plant comprising elements exposed to an aggressive environment, the improvement comprising the step of forming said elements from a cobalt-free iron-base wear-resistant and anti-galling hardfacing alloy consisting essentially by weight of about 1.10–1.35% carbon; at least 4.0%, but less than 5.0% manganese; 3.0–3.5% silicon; 22.5–26.0% chromium; 3.7–4.2% nickel; 1.8–2.2% molybdenum; 0.02–0.18% nitrogen; less than 0.018% phosphorus: less than 0.010% sulphur; less than 0.002% boron; and the balance iron; said alloy having a microstructure consisting essentially of austenitic matrix and eutectic alloy carbides.

6. A method according to claim 5, wherein said alloy contains about 3.1–3.5% by weight silicon about 24.0–26.0% by weight chromium and about 0.14–0.18% by weight nitrogen.

7. A method according to claim 5, wherein said alloy is capable of being deposited on a substrate by welding, wherein preheating of the substrate is unnecessary.

8. A method according to claim 5, wherein said alloy consists essentially by weight of 1.25% carbon; 4.5% manganese; 3.3% silicon; 25.0% chromium; 4.0% nickel; 2.0% molybdenum; 0.16% nitrogen; less than 0.018% phosphorus; less than 0.010% sulphur; less than 0.002% boron; and the balance iron; said alloy having a microstructure consisting essentially of austenitic matrix and eutectic alloy carbides.

9. A cobalt-free iron-base, wear-resistant and anti-galling, hardfacing structural element for use in an aggressive environment produced according to the method of claim 5.

10. An alloy according to claim 3, wherein the substrate is carbon steel.

11. An alloy according to claim 3, wherein the substrate is stainless steel.

12. An alloy according to claim 3, wherein the welding is gas tungsten arc welding.

13. An alloy according to claim 5, wherein said plant is a nuclear power plant.

14. An alloy according to claim 1, wherein said alloy is cast.

15. An alloy according to claim 1, wherein said alloy is in strip form.

* * * * *